(12) United States Patent
Wada

(10) Patent No.: US 11,429,613 B2
(45) Date of Patent: Aug. 30, 2022

(54) INFORMATION PROCESSING SYSTEM AND METHOD

(71) Applicant: FUJIFILM Business Innovation Corp., Tokyo (JP)

(72) Inventor: Norihiro Wada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 367 days.

(21) Appl. No.: 16/209,980

(22) Filed: Dec. 5, 2018

(65) Prior Publication Data

US 2019/0236072 A1    Aug. 1, 2019

(30) Foreign Application Priority Data

Jan. 31, 2018 (JP) .............................. JP2018-014235

(51) Int. Cl.
| | | |
|---|---|---|
| *G06F 7/00* | (2006.01) | |
| *G06F 16/2455* | (2019.01) | |
| *G06F 16/25* | (2019.01) | |
| *G06Q 30/06* | (2012.01) | |
| *G06Q 10/06* | (2012.01) | |

(52) U.S. Cl.
CPC ...... *G06F 16/24556* (2019.01); *G06F 16/254* (2019.01); *G06Q 10/0631* (2013.01); *G06Q 30/06* (2013.01)

(58) Field of Classification Search
CPC ......... G06F 16/24575; G06F 16/90335; G06F 16/9535; G06F 16/335; G06F 16/24556; G06F 16/254; G06Q 30/00; G06Q 30/06; G06Q 30/0623; G06Q 30/0631; G06Q 10/083; G06Q 10/0631; G06K 9/46
See application file for complete search history.

(56) References Cited

U.S. PATENT DOCUMENTS

| | | | |
|---|---|---|---|
| 2002/0128910 A1 | 9/2002 | Sakuma | |
| 2007/0276857 A1* | 11/2007 | Fujio | ................ G06F 16/2428 |
| 2012/0284152 A1* | 11/2012 | Hashiyama | ........ G06Q 30/0207 |
| | | | 705/27.1 |
| 2013/0254176 A1 | 9/2013 | Davlos | |

(Continued)

FOREIGN PATENT DOCUMENTS

| | | | | |
|---|---|---|---|---|
| CA | 2990217 A1 * | 6/2018 | ............. | G06Q 20/00 |
| JP | 2000251001 | 9/2000 | | |

(Continued)

OTHER PUBLICATIONS

"Office Action of Japan Counterpart Application", dated Nov. 30, 2021, with English translation thereof, pp. 1-9.

(Continued)

*Primary Examiner* — Mohammad A Sana
(74) *Attorney, Agent, or Firm* — JCIPRNET

(57) ABSTRACT

An information processing system includes a storage section that stores environment information related to plural customers, a verifying section that verifies a change occurring in the environment information, an extracting section that extracts attendant information which is information attendant on the change, and a search condition generating section that generates a search condition for narrowing down, from the environment information, a target for which a condition matches the attendant information.

13 Claims, 6 Drawing Sheets

(56) References Cited

U.S. PATENT DOCUMENTS

| | | | |
|---|---|---|---|
| 2013/0282523 A1* | 10/2013 | Pfeffer | G06Q 30/06 705/26.35 |
| 2016/0378767 A1* | 12/2016 | Yamamoto | G06F 16/9535 707/727 |
| 2018/0174217 A1* | 6/2018 | Iriyama | G06Q 30/0633 |
| 2018/0181452 A1* | 6/2018 | Yamawaki | H04N 1/00938 |

FOREIGN PATENT DOCUMENTS

| | | |
|---|---|---|
| JP | 2001209701 | 8/2001 |
| JP | 2002334201 | 11/2002 |
| JP | 2003099581 | 4/2003 |
| JP | 2004280442 | 10/2004 |

OTHER PUBLICATIONS

"Office Action of Japan Counterpart Application" with English translation thereof, dated Jun. 14, 2022, p. 1-p. 5.

* cited by examiner

FIG. 5A

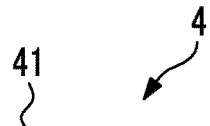

- PLEASE SELECT.
- ALL BUSINESS OFFICES
- AGENT IS NOT OPERATING
- POSSIBILITY THAT NAS IS NOT PRESENT
- POSSIBILITY THAT Server V REMAINS
- PC OF WHICH ELAPSED YEAR IS LONGER THAN OR EQUAL TO FIVE YEARS IS PRESENT
- PC OF WHICH RATE OF USE OF HARD DISK IS HIGHER THAN OR EQUAL TO 50% IS PRESENT
- PC IN WHICH ANTIVIRUS SOFTWARE IS NOT INTRODUCED IS PRESENT

FIG. 5B

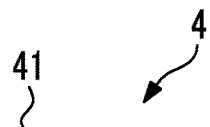

- PLEASE SELECT.
- ALL BUSINESS OFFICES
- AGENT IS NOT OPERATING
- POSSIBILITY THAT NAS IS NOT PRESENT
- POSSIBILITY THAT Server V REMAINS
- PC OF WHICH ELAPSED YEAR IS LONGER THAN OR EQUAL TO FIVE YEARS IS PRESENT
- PC OF WHICH RATE OF USE OF HARD DISK IS HIGHER THAN OR EQUAL TO 50% IS PRESENT
- PC IN WHICH ANTIVIRUS SOFTWARE IS NOT INTRODUCED IS PRESENT
- ★ CUSTOMER HAVING HIGH COMPETITION RISK

FIG. 6A

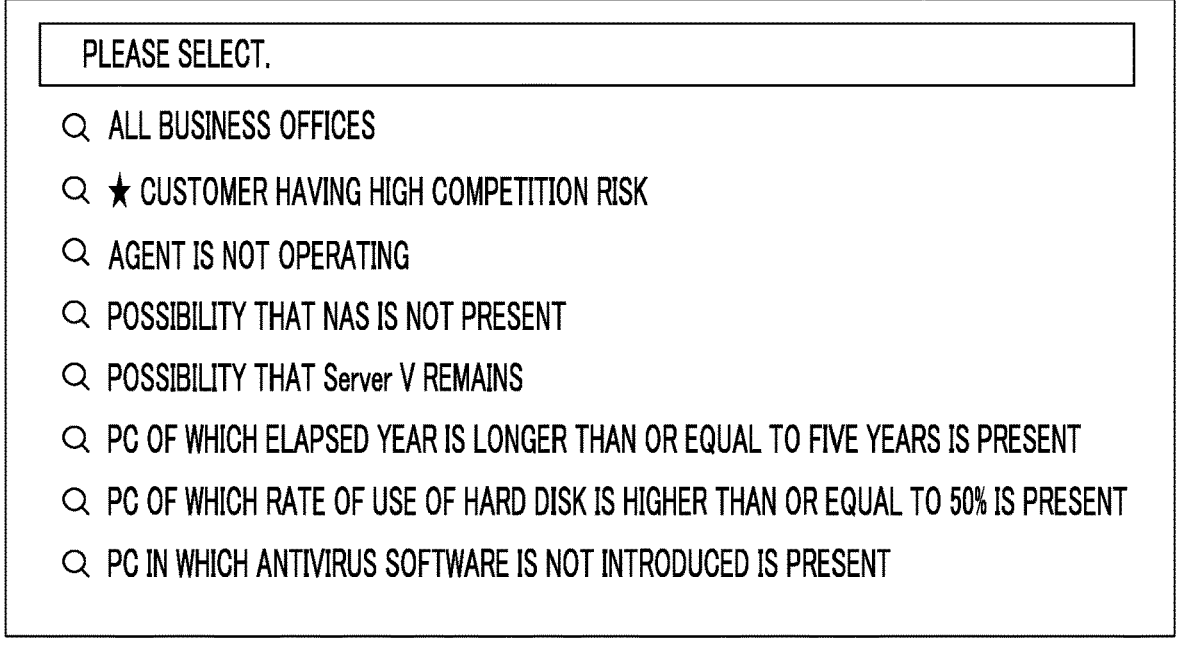

PLEASE SELECT.

- 🔍 ALL BUSINESS OFFICES
- 🔍 ★ CUSTOMER HAVING HIGH COMPETITION RISK
- 🔍 AGENT IS NOT OPERATING
- 🔍 POSSIBILITY THAT NAS IS NOT PRESENT
- 🔍 POSSIBILITY THAT Server V REMAINS
- 🔍 PC OF WHICH ELAPSED YEAR IS LONGER THAN OR EQUAL TO FIVE YEARS IS PRESENT
- 🔍 PC OF WHICH RATE OF USE OF HARD DISK IS HIGHER THAN OR EQUAL TO 50% IS PRESENT
- 🔍 PC IN WHICH ANTIVIRUS SOFTWARE IS NOT INTRODUCED IS PRESENT

FIG. 6B

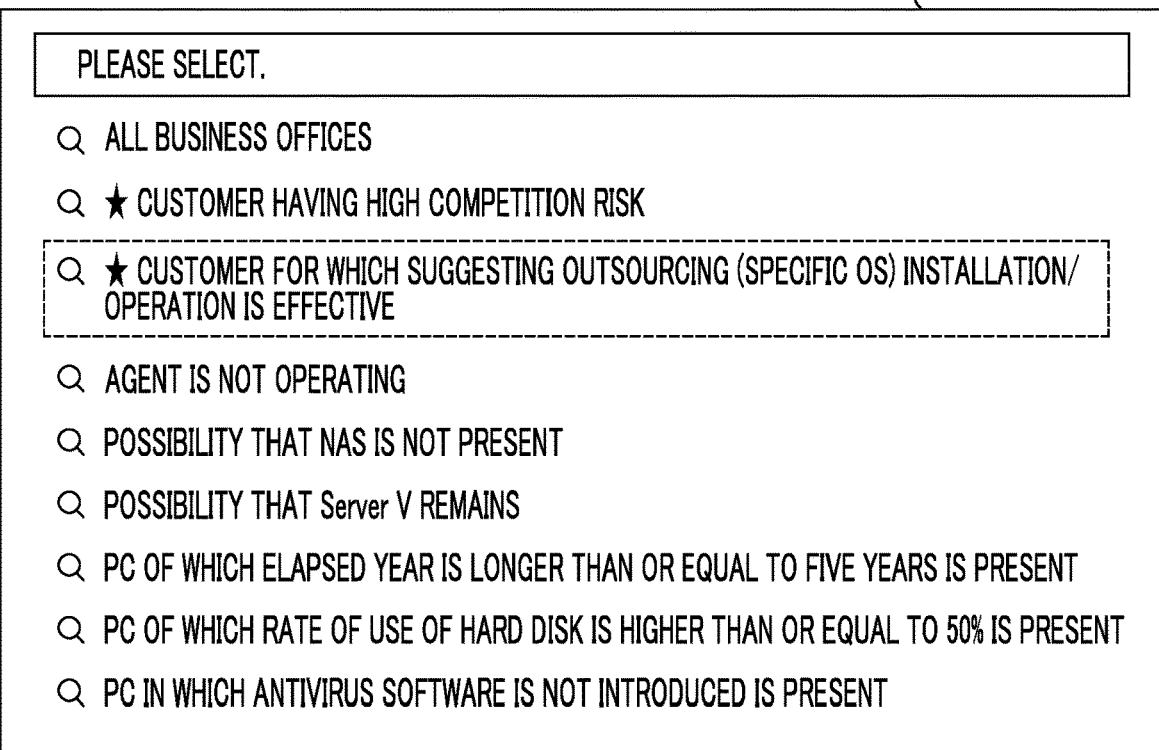

PLEASE SELECT.

- 🔍 ALL BUSINESS OFFICES
- 🔍 ★ CUSTOMER HAVING HIGH COMPETITION RISK
- 🔍 ★ CUSTOMER FOR WHICH SUGGESTING OUTSOURCING (SPECIFIC OS) INSTALLATION/ OPERATION IS EFFECTIVE
- 🔍 AGENT IS NOT OPERATING
- 🔍 POSSIBILITY THAT NAS IS NOT PRESENT
- 🔍 POSSIBILITY THAT Server V REMAINS
- 🔍 PC OF WHICH ELAPSED YEAR IS LONGER THAN OR EQUAL TO FIVE YEARS IS PRESENT
- 🔍 PC OF WHICH RATE OF USE OF HARD DISK IS HIGHER THAN OR EQUAL TO 50% IS PRESENT
- 🔍 PC IN WHICH ANTIVIRUS SOFTWARE IS NOT INTRODUCED IS PRESENT

INFORMATION PROCESSING SYSTEM AND METHOD

CROSS-REFERENCE TO RELATED APPLICATIONS

This application is based on and claims priority under 35 USC 119 from Japanese Patent Application No. 2018-014235 filed Jan. 31, 2018.

BACKGROUND

(i) Technical Field

The present invention relates to an information processing system.

(ii) Related Art

JP2000-251001A discloses an optimal product extraction method in connection with a visiting schedule with respect to a sales support system that includes a central operation processing device, a screen display device, an input device, a storage device, and a high capacity storage device in a service provider. The high capacity storage device manages service use records of a customer. The optimal product extraction method is characterized as an optimal service suggestion sales support method including a section that searches for a customer who is not visited a certain period or longer, from the status of a visiting result of a salesperson for each customer, and a section that finds a suggested product and the like to be used at the time of visiting by matching an index characterizing the form of service use of the customer with characteristics of a service of the service provider.

SUMMARY

A decrease in use value of a search result caused by a change in a customer environment may be suppressed, or the use value may be improved, provided that a search condition that is used at the time of narrowing data down from multiple data for a certain intention may be generated depending on the customer environment.

Aspects of non-limiting embodiments of the present disclosure relate to an information processing system that generates a search condition which may suppress a decrease in use value of a search result affected by a change in a customer environment, or may improve the use value.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a storage section that stores environment information related to a plurality of customers, a verifying section that verifies a change occurring in the environment information, an extracting section that extracts attendant information which is information attendant on the change, and a search condition generating section that generates a search condition for narrowing down, from the environment information, a target for which a condition matches the attendant information.

BRIEF DESCRIPTION OF THE DRAWINGS

Exemplary embodiment(s) of the present invention will be described in detail based on the following figures, wherein:

FIGS. 5A and 5B are diagrams illustrating a display example of a search expression on a sales terminal of the sales support system: FIG. 5A illustrates a search expression display area before addition, and FIG. 5B illustrates the search expression display area in a case where a new search expression is added; and FIGS. 6A and 6B are diagrams illustrating a display example of a search expression on the sales terminal of the sales support system: FIGS. 6A and 6B illustrate the search expression display area in a case where a new search expression is added.

DETAILED DESCRIPTION

Hereinafter, an exemplary embodiment of the present invention will be described in detail with reference to the appended drawings.

Figure 1:
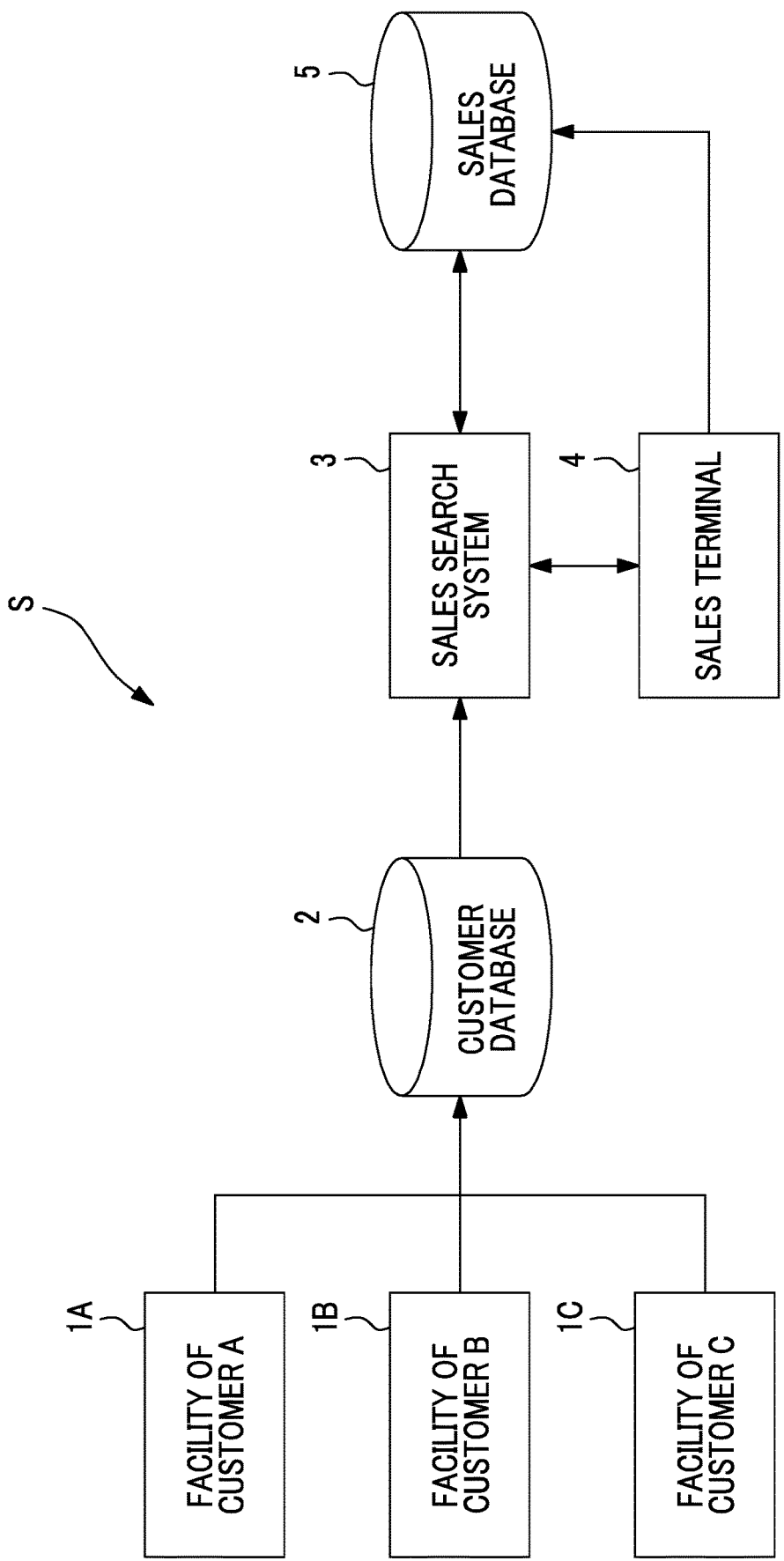
FIG. 1 is a block diagram for describing an overview of a sales support system.

FIG. 1 is a block diagram for describing an overview of a sales support system S.

The sales support system S illustrated in FIG. 1 is intended to reduce a load of a sales task and achieve efficiency in sales outcome by supporting a sales activity of a salesperson (a user of the sales support system S; hereinafter, referred to as the "user") who performs a sales activity by selling a product or providing a service to a customer. The sales support system S has configurations including a customer database 2, a sales search system 3, a sales terminal 4, and a sales database 5. Data that is transmitted from a facility 1A of a customer A, a facility 1B of a customer B, and a facility 10 of a customer C which are customer-side facilities is accumulated in the customer database 2. The sales search system 3 searches for data accumulated in the customer database 2 for sales to the customer. The sales terminal 4 is used by the user who is a salesperson. Data from the sales terminal 4 and the like is accumulated in the sales database 5. Each configuration is connected through a network (not illustrated) and may transmit and receive information. The facility 1A of the customer A, the facility 1B of the customer B, and the facility 1C of the customer C may be simply referred to as a "facility 1 of the customer". While FIG. 1 illustrates a state where data from the customers A to C is accumulated in the customer database 2, the state is one example for convenience of description. Data from a larger number of customers may be accumulated.

Each of the customers A to C is an enterprise or a company that is a sales target. A headquarter of the customer or a distributedly located office, a base, or a facility such as a subdivision, a branch, a sales office, a business office, or a research office may be the unit of the customer. In addition, in a case where the customer has, for example, an image forming apparatus, a personal computer (PC), or a portable information terminal, the facilities 1A to 10 of the customers A to C, that is, the facility 1 of the customer, includes each device (hardware configuration) and also includes various kinds of software (software configuration) such as an operating system (OS) that is used in the PC or the portable information terminal. In addition, the facility 1 of the customer includes various kinds of devices that communicate with various kinds of information by connecting to a network (network configuration).

The customer database 2 is an apparatus that stores data related to the facility 1 of the customer. For example, data that is collected by software installed on the PC in the facility 1 of the customer and is transmitted to the customer database 2 is stored. The customer database 2 may store not only the data transmitted from the side of the facility 1 of the customer but also data that is input by the sales terminal 4 or other terminals.

The sales search system 3 has a function of performing a search based on the data of the customer database 2 or the sales database 5 in accordance with an instruction and displaying a search result on the sales terminal 4 in a case where the sales search system 3 receives the instruction from the sales terminal 4.

The sales terminal 4 is a terminal operated by the user of the sales support system S and is, for example, a PC or a portable information terminal. The sales terminal 4 may transmit, to the sales search system 3, information (for example, ID information) for specifying the user who performs a search using the sales support system S.

The sales database 5 is an apparatus that stores sales-related data which is used in a sales activity along with the data of the customer database 2. Data including the data input by the sales terminal 4 or other terminals may be stored. The data stored in the sales database 5 includes information related to a product as a subject of sales and information related to sales to the customers A to C.

Each of the sales search system 3 and the sales terminal 4 is configured with a central processing unit (CPU) for performing calculation and the like by executing software, a random access memory (RAM), a read only memory (ROM), a display device such as a display, an input device for providing input to a computer main body, and the like. In addition, each of the sales search system 3 and the sales terminal 4 may be physically one computer, or may be implemented as distributed processes performed by multiple computers.

In addition, the customer database 2 and the sales database 5 may be configured with a single apparatus, or each of the customer database 2 and the sales database 5 may be configured with a single apparatus or multiple apparatuses.

Next, the sales support system S according to the present exemplary embodiment will be described.

Figure 2:
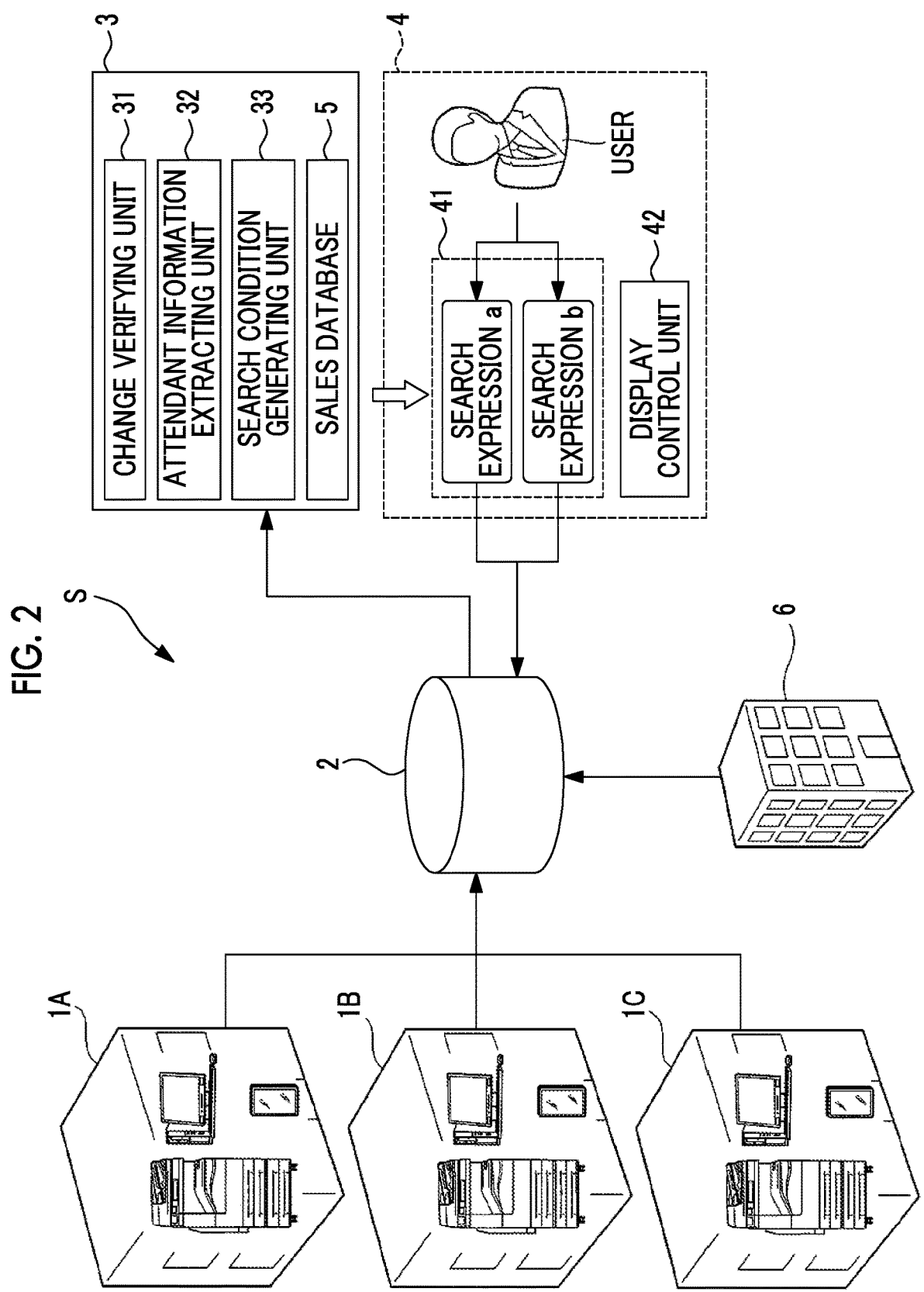
FIG. 2 is a diagram for describing the sales support system according to the present exemplary embodiment.

FIG. 2 is a diagram for describing the sales support system S according to the present exemplary embodiment, and more specifically illustrates the overview illustrated in FIG. 1. Hereinafter, the text "customer" of the customers A, B, and C may be replaced with "office" as a unit of customers or a unit of sales.

As illustrated in FIG. 2, the sales support system S is configured such that environment information related to the multiple customers A to C is collected in the customer database 2. The environment information collected in the customer database 2 is information related to an information technology (IT) environment of the customer, and is information that includes information related to the devices of the customers A to C and information related to a device environment surrounding the devices. The environment information is one example of environment information related to a customer.

Various kinds of information that may contribute to a sales activity and the like for the office are collected in the customer database 2 of the sales support system S. In such a manner, the information related to the device installed in each of the offices A to C is collected for each customer and aggregated in the customer database 2. In addition, the information related to the device environment surrounding the devices of the offices A to C is collected for each customer and aggregated in the customer database 2.

As will be described below, the sales support system S generates a common item as a new search condition or a search expression from information aggregated in the customer database 2. Thus, the user may perform a search in the sales terminal 4 using a search expression a or a search expression b illustrated in FIG. 2.

The sales terminal 4 includes a display unit 41 such as a display, and a display control unit 42 such as a CPU that controls display such that a search expression is selectable on the display unit 41.

The information related to the devices of the customers A to C is information that indicates a configuration or the state of the device of each of the customers A to C, and includes device information, and contact information or call reception information. The device information is information for specifying the type or the number of devices. The contact information or the call reception information is information that indicates that a contact is made from the customer with respect to the device.

The device information includes not only information specifying the hardware configuration but also information that is information related to software introduced in the device and specifies the software configuration. In addition, the device information includes not only information specifying the device type of an own product of the company but also information indicating whether or not the device of the customer is the own product of the company. Information that indicates that the device of the customer is not the own product of the company may be acquired by detecting, for example, a printer driver.

In addition, the device information includes history information that is information indicating a history of the device. The history information is usage information (use information) indicating the way that the device is used, or operating information indicating an operating status of the device. The history information is information that depends on the type of the device. For example, for the image forming apparatus, the history information may include information related to the cumulative number of sheet outputs or the number of sheet outputs in a specified period, the type and the size of an output sheet, the number of times of outputs with a number n specified as the number of pages, and the like. In addition, the history information may include information related to a tendency of an output type such as double-sided copy using a printing function, a tendency of use of a scan function, a tendency of output of data received using a facsimile function, and the like. In addition, for example, for the PC, the history information may include information related to the type of the used OS, a load state of the CPU, a vacant capacity of a storage device, and the like. In addition, for example, the history information may include information that specifies the number of years after the device is purchased.

The device information is information that is collected through a network by executing specified software. The contact information (call reception information) is information other than information that is automatically collected by executing software. For example, the contact information includes contract information indicating the content of a contract such as maintenance between each of the customers A to C and the enterprise of the user, and also includes customer contact point information such as information indicating the content of a telephone call made to a call center 6 from each of the customers A to C due to occurrence of a failure, or information that is notified by communication such as mail to a customer center which conceptually includes the call center 6. The customer contact point information includes sales result information that is information indicating whether the result of sales is successful or failed. By including the sales result information, a search may be performed for a customer who is close to a successful case. A configuration in which the sales result information is stored in the sales database 5 and not in the customer database 2 and is read as needed may be employed.

In addition, information that is collected in the customer database 2 with respect to the device environment is information related to the environments surrounding the devices of the customers A to C, and is information for each of the customers A to C having devices. For example, the information related to the device environment includes information related to a region where each of the customers A to C is located, and information related to a business type that is the type of business or sales for each of the customers A to C. It is noted that the way of using the device by the customers A to C is different depending on the region or the business type. The frequency of use or the form of use of the device is different between regions or business types, and different tendencies are found between regions or business types.

While the information related to the device is variable along with an elapse of time, the information related to the device environment is less likely to change than the information related to the device even with an elapse of time. The information related to the device environment may be referred to as attribute information that is information indicating properties of the customer.

The environment information related to the customers A to C includes not only the information related to the device and the information related to the device environment, but also enterprise information such as an intracompany change within organization, or merger or acquisition of the enterprises of the customers A to C. Such information includes various kinds of information that may contribute to a sales activity, that is, information that may be used for recognizing the current state of the customer who is a sales target, or for extracting an explicit or potential object of the customer.

The user acquires necessary information using the sales terminal 4 based on the environment information accumulated in the customer database 2. Specifically, the user narrows data down from data accumulated in the customer database 2 using a search expression for searching for intended information.

Not only data is narrowed down by causing the user to directly input such a search expression into the sales terminal 4 (input method), but also data is narrowed by displaying multiple preset search expressions on the sales terminal 4 and causing the user to select any search expression (menu method). The former enables data to be narrowed down to the intended data by creating a search expression from input of a keyword based on the content of sales, records, experience, and the like in the past. Thus, the former is for the user who has long sales experience, and the user who does not have such sales experience may not easily narrow data down to the intended data. Meanwhile, the latter enables data to be narrowed down by selecting any of the preset search expressions, and may reduce differences among individual users. However, in the case of the latter, the search expression is limited to the preset search expressions. The search expression that does not change is used in a case where the search expression is not updated by periodic or aperiodic maintenance, and changing a sales strategy depending on the status of the customer or various trends in the world (change in customer environment) is not easy.

Therefore, in the present exemplary embodiment, the sales strategy may be changed depending on a change in customer environment by enabling the user to perform a search using a common item in the information that is collected from each user at all times. That is, the sales search system 3 generates a new search expression based on a common item in the data or the information in the customer database 2 and the sales database 5, and accumulates the generated new search expression in the sales database 5. The accumulated search expression is additionally displayed on the display unit 41 of the sales terminal 4 by the display control unit 42, and a search for a customer may be performed depending on a change in customer environment.

In the configuration example illustrated in FIG. 2, the sales search system 3 includes a change verifying unit 31, an attendant information extracting unit 32, a search condition generating unit 33, and the sales database 5. The change verifying unit 31 verifies a change that occurs in the environment information in the customer database 2. The attendant information extracting unit 32 extracts attendant information that is information attendant on the verified change. The search condition generating unit 33 generates a search condition (search expression) for narrowing down, from the environment information, a subject for which a condition matches the attendant information. The sales database 5 stores the search condition generated by the search condition generating unit 33.

The sales search system 3 is one example of an information processing system. The sales search system 3 that is configured to include the sales terminal 4 may also be one example of the information processing system. Furthermore, the sales search system 3 that is configured to include the customer database 2 and/or the sales database 5 may be one example of the information processing system. In addition, the customer database 2 is one example of storage means. The change verifying unit 31 is one example of verifying means. The attendant information extracting unit 32 is one example of extracting means. The search condition generating unit 33 is one example of search condition generating means. The sales terminal 4 is one example of an information processing apparatus. The display unit 41 is one example of display means. The display control unit 42 is one example of display control means.

The change verifying unit 31 verifies a change in item that has a possibility of affecting customer service. The item for which a change is to be verified is selected in advance from the environment information.

The change in item is a change in customer environment for specifying an element for which using the change in item at the time of generating the search condition may reduce a decrease in the use value of the search result or increase the use value. The change in item may be not only a time-series change that is changeable with an elapse of time, but also a non-time-series change that is unlikely to change with an elapse of time. The time-series change is the information related to the device in the environment information. The non-time-series change is the information related to the device environment in the environment information. As described above, the information related to the device environment may be a difference between different regions or a difference between different business types.

Accordingly, the change verifying unit 31 verifies not only the time-series change but also a difference between regions and a difference between business types.

By accumulating the information related to the device in the customer database 2 along with time information, a status in the past and the current status may be recognized, and a status of the time-series change along with an elapse of time may be verified. For example, in a case where information related to detection of the product of another company is present as the device information in the customer database 2, the change verifying unit 31 may verify a change in outflow to the product of another company by periodically verifying the trend of the information. In addition, for example, in a case where information related to occurrence of blurry printing is present as failure information in the customer database 2, the change verifying unit 31 may periodically verify a change in increase or decrease of a call reception ratio. In addition, for example, in a case where information related to introduction of a specific OS is present as the device information in the customer database 2, the change verifying unit 31 may periodically verify the state of increase in the number of pieces of the information. The time information that is accumulated along with the information related to the device not only may include detailed time information of year, month, date, hour, minute, and second, but also may be information such as year, month, and date depending on the type of the device.

In addition, by accumulating the information related to the device in the customer database 2 in association with the regions and/or the business types of the customers A to C, the change verifying unit 31 may verify a difference between regions or a difference between business types for the information related to the device.

Furthermore, in a case where the information related to the device is accumulated in the customer database 2 along with the time information and the regions and/or the business types of the customers A to C, a region X and a region Y may be compared with each other for outflow to the product of another company by performing data processing. For example, in a case where the region X has a larger change than the region Y, the change verifying unit 31 may verify a change in outflow to the product of another company in the region X.

In addition, the average value of the information related to the device within a period may be calculated for each region or each business type of the customers A to C, and a threshold for verifying the change may be set depending on the region and/or the business type.

From such a viewpoint, the information related to the device environment includes information (regions and business types) that is used for evaluating the information related to the device of each of the customers A to C.

Further describing, the way of using the device by the customer is different depending on the region or the business type. Thus, in the sales search system 3, for example, the region or the business type of each customer may be specified as the information related to the device environment. The average value may be acquired for each region or each business type, and a search expression that sets the predetermined condition depending on the region or the business type may be generated. That is, the predetermined condition is differently set depending on the region or the business type. For example, for the region, it is assumed that the failure information for the image forming apparatus is different between relatively dry Hokkaido and relatively humid Okinawa. In addition, for the business type, for example, real estate business that deals with rentals by performing a sales activity to an individual is a business type for which the number of outputs is large due to distributed leaflets, materials displayed in a store, contracts, and the like. Meanwhile, in an IT enterprise where work tends to be performed by displaying materials on a PC rather than printing the materials, the business type has a small number of outputs.

Accordingly, by setting the condition for each region or each business type using an average between regions or an average between business types, a search expression that may contribute to a sales activity further than that in the case of an overall average where the region or the business type is not categorized may be generated.

In a case where the change verifying unit 31 verifies a change in item (an item) that has a possibility of affecting customer service, the attendant information extracting unit 32 extracts, from the environment information in the customer database 2, the attendant information that is attendant on the change. The attendant information is the environment information (information that is common in the risk) that is common for the customer with the verified change. It is considered that the number of pieces of attendant information may be not only one but also more than one.

In a case where the same change is verified among multiple customers, the attendant information extracting unit 32 extracts the common change in the environment information of each customer as the attendant information. For example, in the case of a change that is outflow to the product of another company, the attendant information is such that the device type matches, the elapsed year is greater than or equal to a threshold, and the number of outputs is less than a threshold. In addition, in the case of a change that is an increase in the number of pieces of failure information indicating blurry printing, the attendant information is such that the number of outputs is greater than or equal to a threshold, and a maintenance contract is not made. In addition, in a case where an increase in the number of introductions of a specific OS is verified, the attendant information is such that the number of pieces of failure information indicating occurrence of trouble is increased to or above a threshold, and specific software is introduced.

While such attendant information is either the device information, the history information, or the call reception information that is information related to the device, the attendant information may be associated with a change in item in advance or may not be associated with a change in item in advance. The attendant information may be configured to be added or deleted by learning through verification of a change and repeated extraction of the attendant information.

The search condition generating unit 33 of the sales search system 3 generates a search condition for narrowing down, from the environment information, a subject for which a condition matches the attendant information. The subject is a candidate of a sales activity target displayed as a search result, and includes, for example, the customer or the device. The generated search condition may be secondarily used such that the search condition is generated using the result of narrowing down that is previously performed.

Figure 3:
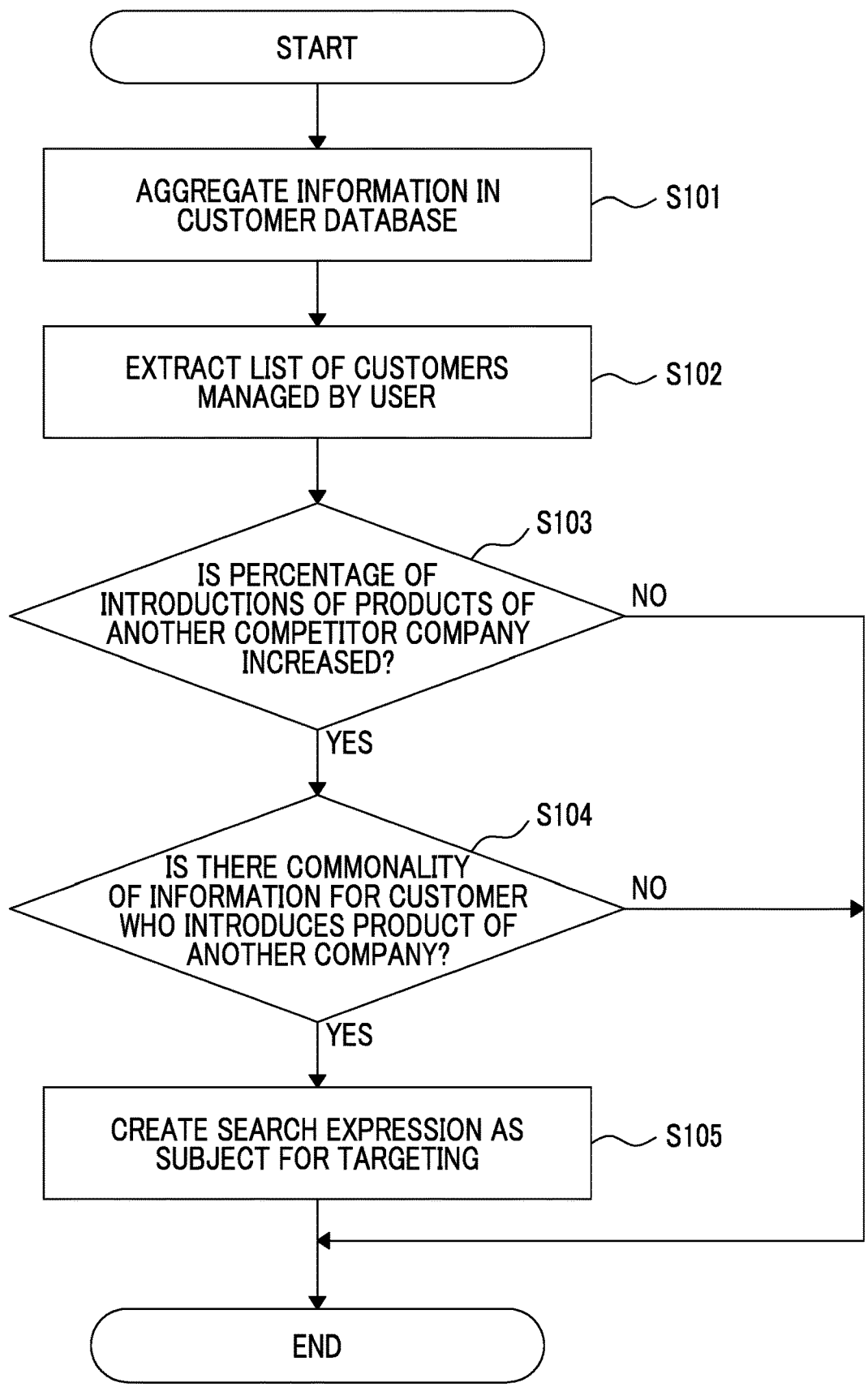
FIG. 3 is a flowchart illustrating a first processing procedure example in the sales support system.

FIG. 3 is a flowchart illustrating a first processing procedure example in the sales support system S.

The information related to the device in the office is aggregated in the customer database 2 by executing software in the PC or the like in the offices of the customers A to C (S101). By periodically executing the software, the information related to the device may be collected at all times, and the most recent information is retained in the customer database 2 at all times. In addition, as described above, the information related to the device environment surrounding the device of the office is also aggregated in the customer database 2 through the call center 6 and the like.

The sales search system 3 extracts a list of customers managed by the user (sales company) (S102) and detects a change in environment information based on the environment information in the customer database 2 and information in the sales database 5. Such a change may be detected from not only the information related to the device in the environment information but also the information related to the device environment. Since the list of customers managed by the user is extracted, the generated search expression is different depending on the managed customer. In other words, the generated search expression may be different in a case where a managed area is different.

For example, the change verifying unit 31 of the sales search system 3 extracts a product of another competitor company from the information related to the device, and determines whether or not the percentage of introductions of the product of another competitor company is increased (S103). That is, in a case where the percentage of introductions of the product of another competitor company exceeds a predetermined threshold (Yes in S103), the attendant information extracting unit 32 determines whether or not there is commonality of information for the customer who introduces the product of another company (S104). In a case where the percentage of introductions of the product of another competitor company does not exceed the predetermined threshold (No in S103), it is determined that the condition is not significant for targeting at the current time, and the process is finished.

The commonality of information means that in a case where events that occur are the same or similar to each other, information related to the events has any common matter. For example, in the case of an event where the number of inquiries related to certain software is increased, it is considered that the commonality of information is present when there is a common matter in the information related to the device environment of the customers who make the inquiries.

In a case where there is commonality of information for the customer who introduces the product of another competitor company (Yes in S104), the search condition generating unit 33 of the sales search system 3 creates a search expression as a subject for targeting (S105), and retains the created search expression in the sales database 5. Specifically, commonality is extracted as a search condition that has a high competition risk. For example, the device type matches, the elapsed year is less than a threshold, or the number of outputs is less than a threshold.

In this example, in a case where introductions of the product of another competitor company are increased, a customer who has a risk (replacement risk) of switching to the product of another company is determined from the elapsed year, the device type, the number of outputs, and the like based on the result of the introduction to the customer, and a search expression that enables a search for such a customer is created.

Accordingly, the sales search system 3 defines an item for which a change is to be checked in the information related to the device and/or the information related to the device environment, that is, an item that accompanies a risk for the user at the time of increase. In a case where a change is detected, the sales search system 3 extracts information common for the risk or information attendant on the change. A search expression that causes a hit for a subject for which a condition matches the extracted information is generated. By enabling such a search expression to be used in the sales terminal 4, a list of subjects to be protected from the risk may be displayed on the sales terminal 4.

In the first processing procedure example or a second processing procedure example described below, an example of setting the search condition to be variable depending on a change in environment information for the region to which the user belongs may be applied as the commonality of information. Accordingly, the search condition for the target may be set to be variable in accordance with a market trend (for example, Kyushu region). The way of using the device may be different depending on the region. The search expression is generated depending on the characteristics of the region managed by the user, and the customer in the region may be detected.

Figure 4:
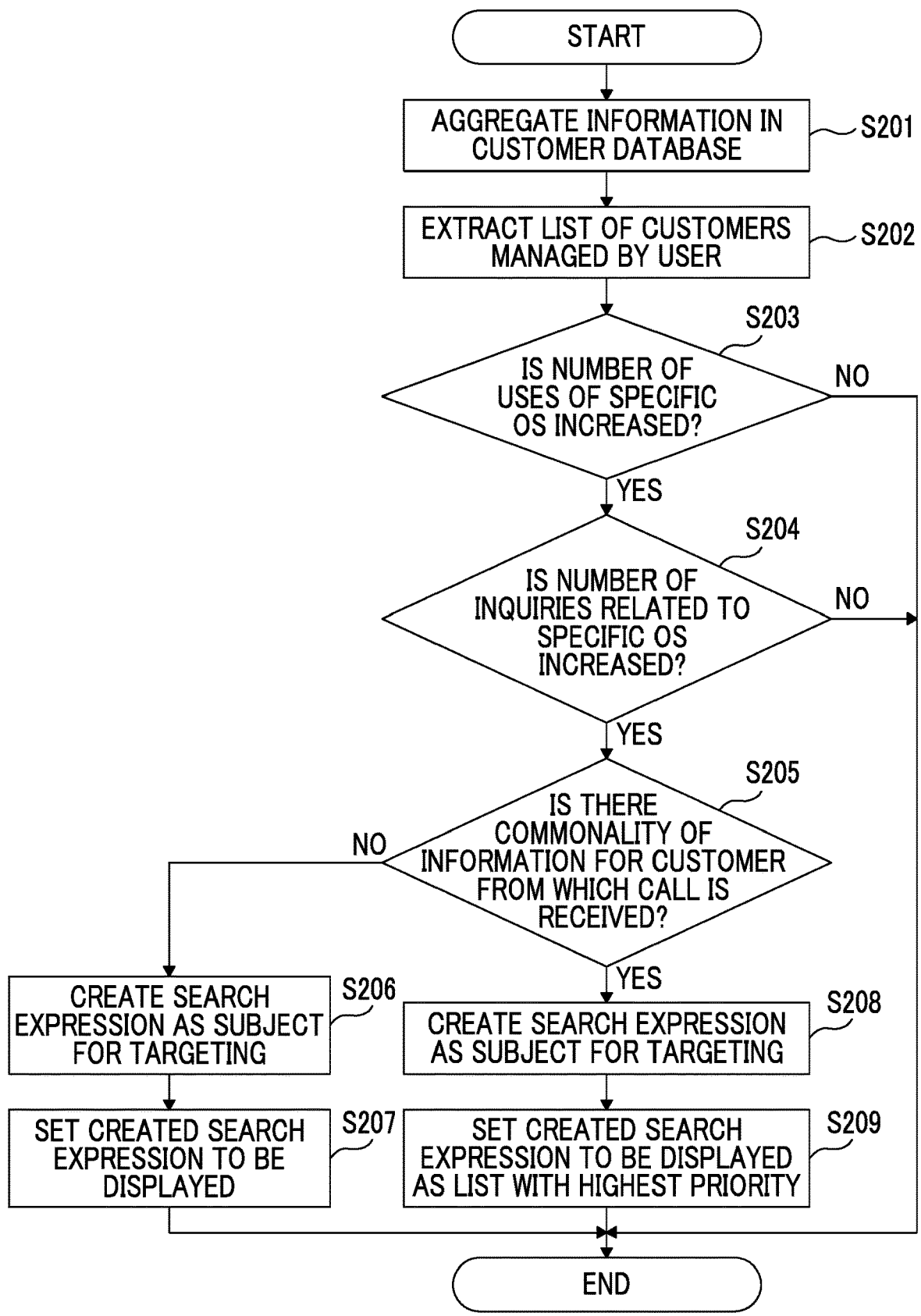
FIG. 4 is a flowchart illustrating a second processing procedure example in the sales support system.

FIG. 4 is a flowchart illustrating the second processing procedure example in the sales support system S. The second processing procedure example illustrated in FIG. 4 includes a content that is common in the first processing procedure example. A description of such a content may not be repeated. S201 and S202 in FIG. 4 correspond to S101 and S102 of FIG. 3.

In a case where the change verifying unit 31 of the sales search system 3 detects an increase in the number of devices (number of uses) that use a specific OS as a change in the information related to the device (Yes in S203), the attendant information extracting unit 32 verifies, from the call reception information stored in the sales database 5, that the number of inquiries related to the specific OS is increased (S204). In a case where the number of uses of the specific OS is increased, and the number of inquiries for the specific OS is increased (Yes in S203 and Yes in S204), the explicit or potential object of the customer may be noted, and the specific OS may be a condition that is significant for targeting.

In a case where the number of uses of the specific OS is not increased (No in S203), it is determined that the condition is not significant for targeting at the current time, and the process is finished. In addition, in a case where the number of inquiries for the specific OS is not increased (No in S204), the process is finished.

In a case where the number of inquiries related to the specific OS is increased (Yes in S204), the sales search system 3 verifies whether or not there is commonality of information for the customer (the customer from which a call is received) from which a call related to the specific OS is received (S205). For example, the presence of software that causes trouble is verified from the information related to the device in the customer database 2. In addition, the presence of characteristics of the managed region may be determined from the information related to the device environment in the customer database 2.

In a case where there is no commonality of information (No in S205), the search condition generating unit 33 of the sales search system 3 creates a search expression as a subject for targeting (S206), and sets the created search expression to be displayable on the sales terminal 4 (S207). Meanwhile, in a case where there is commonality of information (Yes in S205), the search condition generating unit 33 creates a search expression as a subject for targeting (S208), and sets the created search expression to be displayed with highest priority when the search expression is displayed on the sales terminal 4 (S209).

In the second processing procedure example, an example of setting the search condition to be variable depending on a change in environment information for the region to which the user belongs, and intracompany information related to the customer may be applied. Accordingly, a search expression for OS installation may be added depending on a change in the number of OS and a change in the number of call receptions in the call reception information. In a case where the commonality of information is high, an example of generating a search expression by increasing the priority may be used, or an example of generating a list of search expressions by increasing the priority may be used.

FIGS. 5A and 5B and FIGS. 6A and 6B are diagrams illustrating a display example of a search expression on the sales terminal 4 of the sales support system S. FIG. 5A illustrates a search expression display area before addition. FIG. 5B, FIG. 6A, and FIG. 6B illustrate the search expression display area in a case where a new search expression is added. FIG. 5B illustrates a first display example. FIG. 6A illustrates a second display example. FIG. 6B illustrates a third display example. While the search expression is selected using the menu method in FIGS. 5A and 5B and FIGS. 6A and 6B, the present invention is not limited thereto. An example of selecting the search expression that is displayed using a browser is also considered.

As illustrated in FIGS. 5A and 5B and FIGS. 6A and 6B, the sales terminal 4 includes the display unit 41 that includes the search expression display area where the search expression is displayed when the user performs a search. The display control unit 42 that is configured with a CPU and the like in the sales terminal 4 selectably displays the search expression for searching the customer database 2 on the sales terminal 4.

On the display unit 41 of the sales terminal 4 in FIG. 5A, search expressions such as "agent is not operating", "possibility that NAS is not present", "possibility that Server V remains", and "PC of which the elapsed year is longer than or equal to five years." are displayed in order below "all business offices" in the highest part.

In a case where, for example, "customer having high competition risk" is generated as a new search expression according to the first processing procedure example or the second processing procedure example, the new search expression is displayed on the display unit 41 of the sales terminal 4 as in the first display example illustrated in FIG. 5B. That is, in the first display example, the new search expression is additionally selectably displayed on the display unit 41 along with the original search expression illustrated in FIG. 5A.

In the first display example illustrated in FIG. 5B, the display form of the new search expression is different from that of the original search expression illustrated in FIG. 5A. Specifically, the new search expression is displayed to easily attract the attention of the user by providing a star mark at the left end of "customer having high competition risk" as the new search expression, and increasing the displayed text of the new search expression to be larger than the original search expression. Any one of the original search expression or the new search expression is one example of a search condition in a first state, and the other is one example of the search condition in a second state.

More specifically, since the new search expression is for the explicit or potential object of the customer and is a search expression useful for the user, the new search expression is displayed to stand out against other search expressions. Accordingly, the user may easily distinguish the new search expression from the original search expression, and the new search expression easily attracts the attention of the user.

In the sales terminal 4, information related to the date and time or the number of times that is used for a search for each displayed search expression may be acquired, and the display control unit 42 may perform control such that a search expression that is not used in a search is not displayed. Accordingly, an update is performed to display an appropriate search expression at each time (era), and the efficiency of a search work may be achieved.

In addition, the second display example illustrated in FIG. 6A has a common point with the first display example illustrated in FIG. 5B that a new search expression is selectably displayed along with other search expressions, but has a different display position of the new search expression. That is, while the new search expression is added in the lowest part in the first display example, the new search expression is added in an upper part in the second display example, and the new search expression is displayed as a list having the highest priority. Accordingly, in the second display example, compared to the case of the first display example, the new search expression is easily noticed. The usability of the sales terminal 4 at the time of searching may be improved, and a customer to be targeted by the user is easily searched.

The first display example in FIG. 5B corresponds to S207 in FIG. 4, and the second display example in FIG. 6A corresponds to S209 in FIG. 4.

Next, the third display example illustrated in FIG. 6B will be described. In the third display example, the search expression "customer having high competition risk" and a search expression "customer for which suggesting outsourcing (specific OS) installation/operation is effective" are displayed on the display unit 41 of the sales terminal 4 along with other search expressions. In the third display example, the search expression "customer having high competition risk" and the search expression "customer for which suggesting outsourcing (specific OS) installation/operation is effective" are identifiably displayed on the display unit 41. More specifically, a newly generated search expression is categorized as a state (test state; tentative display) where whether or not the generated search expression is to be used as a new search expression is tested, and a state (confirmation state; actual display) where the generated search expression is confirmed to be used as a new search expression. That is, when a new search expression is created, the new search expression is not immediately recommended for use. For example, the user who has extensive sales experience validates the search expression and determines whether or not the search expression is useful. In a case where it is determined that the new search expression is useful, the setting of the search expression is changed to the confirmation state from the test state, and the use of the search expression is recommended.

In the case of FIG. 6B, the search expression "customer having high competition risk" is in the confirmation state, and the search expression "customer for which suggesting outsourcing (specific OS) installation/operation is effective" is in the test state. A new search expression in the test state is surrounded by a broken line box, and a new search expression in the confirmation state is not surrounded by a box. Accordingly, the search expression may be selected depending on the sales experience of the user, and the new search expression before evaluation and the new search expression after evaluation may be recognized. Thus, the user may appropriately use the new search expression depending on the sales experience or the status of the user.

In FIG. 6B, the new search expression in the test state is one example of the search condition in the first state, and the new search expression in the confirmation state is one example of the search condition in the second state.

According to the present exemplary embodiment, a search expression that is present for narrowing down the environment information which is related to the customer and is accumulated in the customer database 2 in the sales search system 3 is selected. Data that is appropriate for the selected condition is narrowed down from multiple data. A new search expression is generated using information that is common among the narrowed data. Thus, a decrease in the use value of the search result may be prevented. In addition, since such a search expression is automatically generated and is set to a state where the search expression is usable by the user, a load of the user may be reduced.

While the present invention is described using the exemplary embodiment, the technical scope of the present invention is not limited to the exemplary embodiment. Those skilled in the art will appreciate that various modifications may be made, or alternative forms may be employed without departing from the spirit and the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a database that stores environment information related to a plurality of customers, wherein the environment information includes at least information related to devices installed in a customer's environment, information related to device environment and enterprise information;
   a memory;
   a processor that is operated with the memory and is configured to
   verify a change in item that has a possibility of affecting customer service and occurs in the environment information, wherein the change in item is a time-series change in the information related to the device in the environment information, or a non-time-series change in the information related to the device environment in the environment information;
   extract attendant information which is information attendant on the change in item, from the environment information in the database; and
   generate a search condition for narrowing down, from the environment information in the database, a target for which a condition matches the attendant information based on the change; and
   a display that displays the search condition,
   wherein in a case where the search condition displayed in the display is selected, the customer or the devices in the customer's environment which corresponds to the search condition is extracted and displayed in the display as the target.

2. The information processing system according to claim 1,
   wherein the change in item is changeable with an elapse of time.

3. The information processing system according to claim 1,
   wherein the change in item is unlikely to change with an elapse of time.

4. The information processing system according to claim 3,
   wherein the change in item is a difference between different regions.

5. The information processing system according to claim 3,
   wherein the change in item is a difference between different business types.

6. The information processing system according to claim 1,
   wherein the attendant information is the environment information that is common for the customer for which the change is verified.

7. The information processing system according to claim 6,
   wherein the attendant information is information related to a device of the customer.

8. The information processing system according to claim 7,
   wherein the attendant information is history information for the device of the customer.

9. The information processing system according to claim 6,
   wherein the attendant information is information that indicates that a contact is made from the customer.

10. The information processing system according to claim 1,
    wherein the display distinctively displays the search condition in a first state and the search condition in a second state.

11. The information processing system according to claim 10,
    wherein the first state in the display is a state where whether or not the search condition is to be used as a new search condition is tested, and
    the second state in the display is a state where the search condition is confirmed to be used as a new search condition.

12. The information processing system according to claim 1,
    wherein the display displays the search condition newly generated by the processor distinctively from another search condition.

13. An information processing method comprising:
    storing environment information related to a plurality of customers in a database, wherein the environment information includes at least information related to devices installed in a customer's environment, information related to device environment and enterprise information;
    verifying a change in item that has a possibility of affecting customer service and occurs in the environment information, wherein the change in item is a time-series change in the information related to the device in the environment information, or a non-timeseries change in the information related to the device environment in the environment information;

extracting attendant information that is information attendant on the change in item, from the environment information in the database; and generating a search condition for narrowing down, from the environment information in the database, a target for which a condition matches the attendant information based on the change; and displaying the search condition on a display, wherein in a case where the search condition displayed in the display is selected, the customer or the devices in the customer's environment which corresponds to the search condition is extracted and displayed in the display as the target.

* * * * *